July 17, 1956                H. J. ROOSDORP                 2,755,421
              DEVICE FOR PROPORTIONAL ELECTRIC CONTROL
                         Filed May 4, 1951
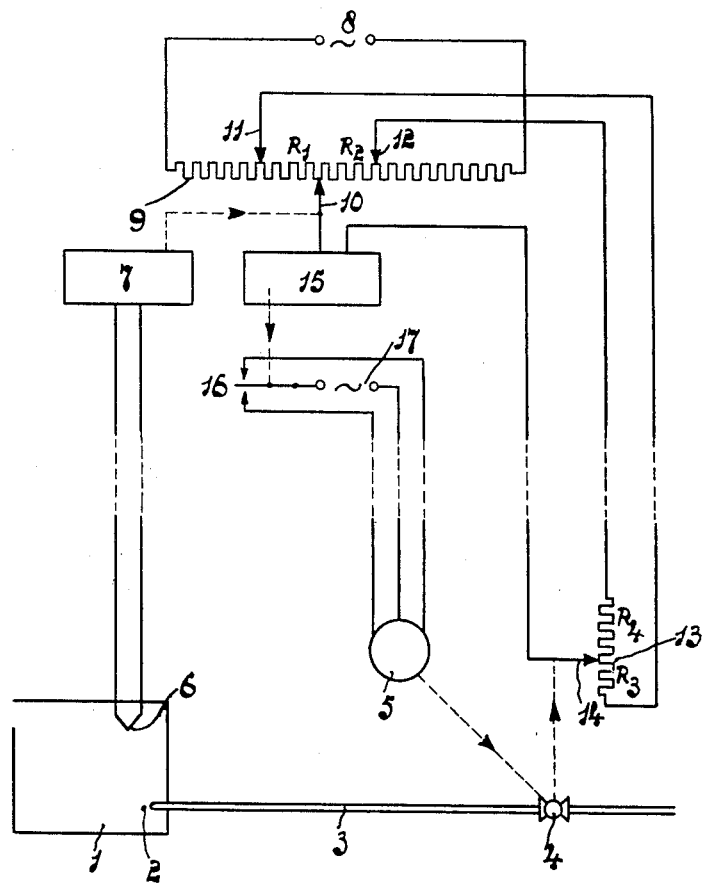
INVENTOR
HERMANUS JOANNES ROOSDORP
BY
AGENT

United States Patent Office 2,755,421
Patented July 17, 1956

2,755,421
DEVICE FOR PROPORTIONAL ELECTRIC CONTROL

Hermanus Joannes Roosdorp, Eindhoven, Netherlands, assignor to Hartford National Bank and Trust Company, Hartford, Conn., as trustee Application May 4, 1951, Serial No. 224,487

Claims priority, application Netherlands May 16, 1950

3 Claims. (Cl. 318—29)

This invention relates to devices for proportional electric control, i. e., devices of the type in which the controlled quantity (e. g., temperature hereinafter referred to as the factor to be controlled) is influenced by a so-called control member and the position of the control member is adjusted in accordance with the difference between the desired and the actual values of the factor to be controlled. In general, the position of the control member is variable only within certain limits, to which limits certain values of the difference between the desired and the actual values of the factor to be controlled correspond. If the difference exceeds these values, proportional control is ruled out. The range in which proportional control is effected may be designated the "proportionality band." The width of this band depends upon the degree to which the position of the control member is made to depend on the difference between the desired and the actual values of the factor to be controlled. If this dependency is considerable, a comparatively small difference will correspond to a considerable variation in the position of the control member. Hence, the proportionality band is narrow.

It is clearly necessary for the width of the proportionality band to be matched to the circumstances. A narrow proportionality band permits accurate control. However, the proportionality band cannot be given an arbitrarily small width, since instability then occurs and is evidenced by fluctuation of the actual value of the factor to be controlled about the desired value, even in the absence of external disturbances of the factor to be controlled. Therefore, the width of the proportionality band is of great importance.

Knowledge of the actual value of the factor to be controlled is of importance to ascertain any discrepancies existing, despite control, between the said value and the desired value. The position of the control member has a considerable influence on operation and should also be known. When it approaches one of the limits of its range, there may be a risk of overstepping the range wherein proportional control is effected. In this event, adequate measures must be taken.

The present invention has for its object to provide a device in which the width of the proportionality band, the actual value of the factor to be controlled and the position of the control member can be rendered easily visible at any given instant and in which the width of the proportionality band and the desired value of the factor to be controlled are adjustable in a simple manner.

For this purpose use is made of a device of the aforesaid type comprising a potentiometer connected to a source of voltage and engaged by a (first) contact whose position varies in accordance with the actual value of the factor to be controlled and in which a member controlling this factor (control member) is urged by a voltage (control voltage) into a position which depends upon the difference between the actual and the desired values of the factor to be controlled, the circuit from which the control voltage is taken comprising a second potentiometer having a movable contact coupled to the control member.

According to the invention the first potentiometer comprises two further adjustable contacts which are connected to the ends of the second potentiometer, the control voltage being taken from the first movable contact of the first potentiometer and the movable contact of the second potentiometer.

In order that the invention may be more clearly understood and readily carried into effect, it will now be described in greater detail with reference to the accompanying drawing, which schematically represents one example thereof applied to the control of furnace temperature.

The control apparatus represented serves to control the temperature of a furnace 1 heated by an oil burner 2. Oil is supplied to burner 2 through oil pipe 3 containing a cock 4 which, in the present case, serves as a control member. The position of the cock 4 is variable by means of an electric motor 5. The cock 4 is coupled to a movable contact 14 of a potentiometer 13 forming part of the control arrangement hereinafter described. The factor to be controlled, i. e. the temperature, is measured with the use of a thermoelectric element 6, the output voltage of which is supplied to an amplifier 7. The output voltage of this amplifier is supplied to an electro-mechanical transducer by which the position of a movable contact 10 of a potentiometer 9 is influenced in such manner that the position of contact 10 is a measure of the temperature. The transducer is not shown and the linkage between 7 and 10 is indicated merely by a broken line for the sake of simplicity.

The actual temperature of the furnace 1 may be deduced from the position of contact 10; for example, a temperature scale may be provided parallel to the resistance element of potentiometer 9, on which scale the position of contact 10 may be read off. The potentiometer 9 is connected to a voltage source 8 which, in the present example, supplies an alternating voltage. Alternatively, however, direct voltage may be used. The potentiometer 9 comprises two further adjustable contacts 11 and 12 which are connected to the ends of potentiometer 13. The control voltage used for adjustment of the cock 4 is taken from the movable contact 10 of the potentiometer 9 and the movable contact 14 of potentiometer 13. This control voltage is supplied to an amplifier 15, the output circuit of which comprises a switch 16 having three positions. This switch is moved into its midposition as represented as soon as the control voltage is substantially zero. In this event, the electric motor 5, which is fed from a voltage source 17 connected to the switch arm, is inoperative. The source 17 is shown as an alternating voltage source. Alternatively, however, it may be a source of direct voltage.

When the switch 16 is brought into one of its extreme positions, the electric motor 5 is actuated. Each of these positions corresponds with one of the two opposite directions of rotation of the electric motor 5. If the source 8 is a source of direct voltage, the switch 16 is brought, through the action of amplifier 15, into either of its extreme positions when the control voltage is positive or negative. If, as in the present example, the source 8 is a source of alternating voltage, the switch 16 is urged, through the amplifier 15, into either of its extreme positions when the phase of the control voltage is equal or opposite to that of the voltage supplied by the source 8.

This control arrangement operates as follows: So long as the bridge constituted by the parts of the potentiometers designated $R_1$, $R_2$, $R_3$, $R_4$ is not in equilibrium, i. e. the condition $R_1:R_2=R_3:R_4$ is not satisfied, the control voltage will not be zero and hence the switch 16 will assume one of its extreme positions. Consequently, the electric motor 5 will become operative and alter the adjustment of cock 4, as a result of which the contact 14 of the potentiometer 13, which contact is coupled to the cock, is moved until the said conditions are satisfied. In this event, the bridge attains equilibrium ($R_1:R_2=R_3:R_4$) and the control voltage is zero so that the switch 16 assumes its central position. Each position of the cock corresponds with a particular position of the contact 14 and hence with a particular ratio between $R_3$ and $R_4$. This ratio is equal to that existing between $R_1$ and $R_2$. Consequently, the position of the cock 4 can be deduced from the ratio existing between $R_1$ and $R_2$ and thus from the position of contact 10 with respect to contacts 11 and 12. What has been said about a particular position of the cock also holds for its extreme positions of adjustment. When the cock 4 moves from its fully-closed position into its fully-open position, the contact 14 will shift along a particular part of the potentiometer 13. In this case, contact 10 will shift along an equal part, between contacts 11 and 12, of the resistor element of the potentiometer 9.

The width of the proportionality band can be deduced from the distance between contacts 11 and 12. When, in a particular case, contact 14 moves from one end of the potentiometer 13 to the other end thereof on bringing the cock from its fully-open into its fully-closed position, the proportionality band corresponds to the spacing between the contacts 11 and 12. On the aforesaid temperature scale, on which contact 10 indicates the actual temperature of the furnace 1, contact 11 then indicates the temperature at which the cock is in one extreme position, contact 12 indicating the temperature at which the cock is in its other extreme position.

It is thus evident that the position of contact 10 is a measure of the true temperature of the furnace 1, the spacing of contacts 11 and 12 a measure of the width of the proportionality band, and the position of contact 10 with respect to contacts 11 and 12 a measure of the position of the cock.

The setting of the desired temperature is effected by jointly displacing the contacts 11 and 12. The previous equilibrium of the aforesaid bridge is thereby destroyed but equilibrium will be re-established as soon as the position of the cock has been altered to a sufficient degree.

If the width of the proportionality band is to be altered, the contacts 11 and 12 must be displaced with respect to one another. In this case, the position of contacts 11 and 12 with respect to the potentiometer 9 is a measure of the temperature limits within which proportional control occurs. If desired, the width of the proportionality band may be reduced to zero.

The desired degree of stability of the setting of the control member is obtained by adjusting the voltage of source 8 and the degree of amplification of the amplifier 15.

What I claim is:

1. A device for automatic proportional electric regulation comprising a first source of voltage, a first resistance connected across said first source of voltage, an element supplying a second source of voltage, a first movable contact mounted for engagement with said first resistance and movement therealong, said first movable contact being controlled by said second source of voltage, a second resistance, a second movable contact mounted for engagement with said second resistance and movement therealong, a control voltage for proportional electric control being taken between said first and second movable contacts, and a pair of adjustable contacts in engagement with said first resistance and movable therealong, said contacts being connected to opposite ends of said second resistance.

2. A device for automatic proportional electric regulation as claimed in claim 1 wherein the positions of said first movable contact and said pair of adjustable contacts on said first resistance is made visible on a single scale.

3. A device for automatic proportional electric regulation of a furnace comprising a first source of voltage, a first resistance connected across said first source of voltage, a thremo-electric element in said furnace supplying a second source of voltage, a first movable contact mounted for engagement with said first resistance and movement therealong, said first movable contact being controlled by said second source of voltage, a second resistance, a second movable contact mounted for engagement with said second resistance and movement therealong, a control voltage for controlling the temperature of said furnace being taken between said first and second movable contacts, and a pair of adjustable contacts in engagement with said first resistance and movable therealong, said contacts being connected to opposite ends of said second resistance.

References Cited in the file of this patent

UNITED STATES PATENTS

| 1,706,968 | Schleicher et al. | Mar. 26, 1929 |
| 2,386,799 | Hunt | Oct. 16, 1945 |
| 2,452,311 | Markusen | Oct. 26, 1948 |

FOREIGN PATENTS

| 473,335 | Germany | Mar. 29, 1929 |